Figure 1:
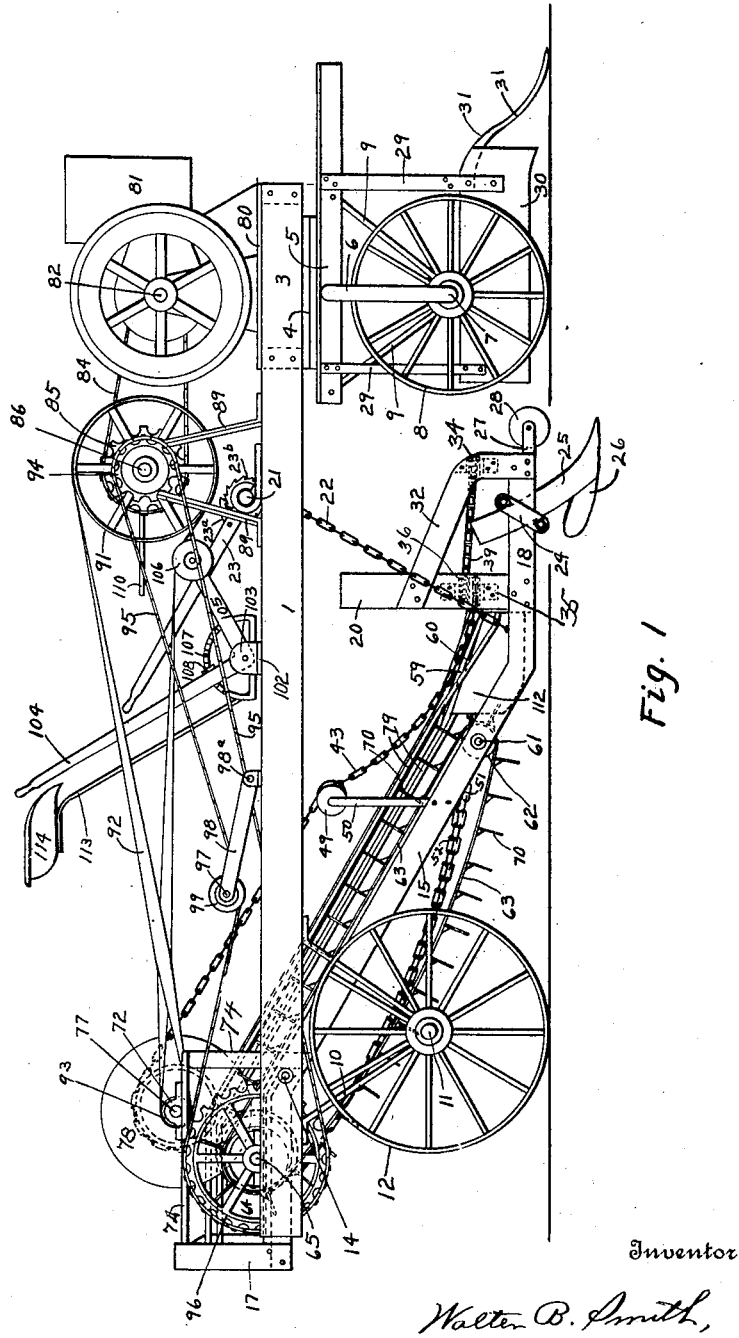

W. B. SMITH.
BEET HARVESTER.
APPLICATION FILED SEPT. 17, 1915.

1,347,596.

Patented July 27, 1920.
2 SHEETS—SHEET 1.

Witness
Walter U Snyder
Ernest T Huston

Inventor
Walter B. Smith,
By Howard S. Smith,
His Attorney

W. B. SMITH.
BEET HARVESTER.
APPLICATION FILED SEPT. 17, 1915.
1,347,596.
Patented July 27, 1920.
2 SHEETS—SHEET 2.
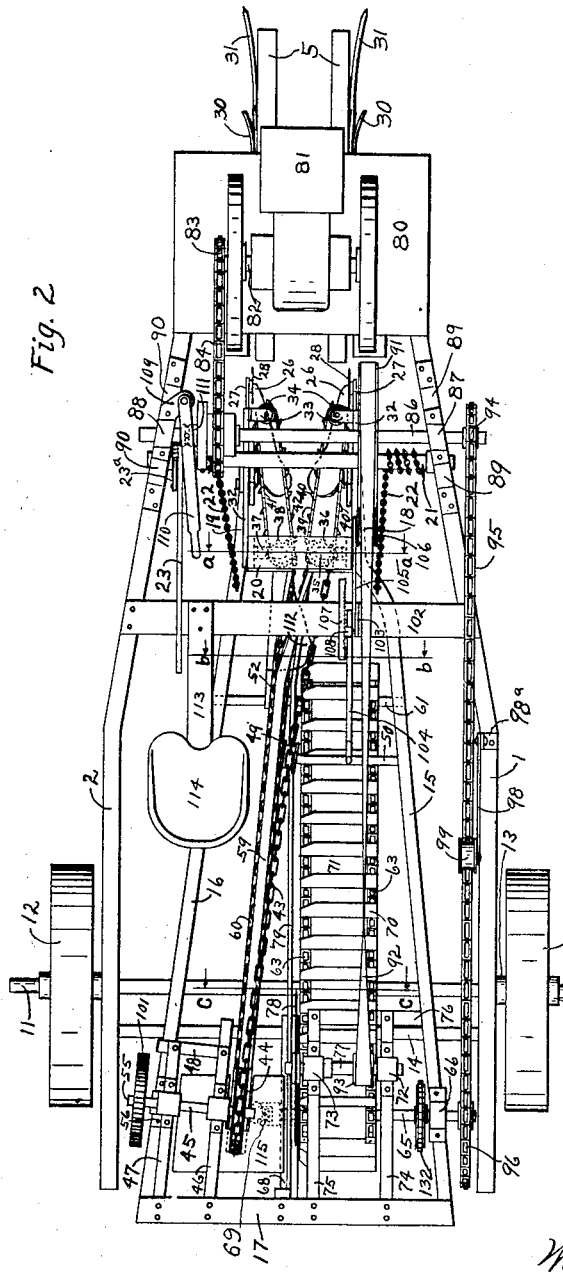
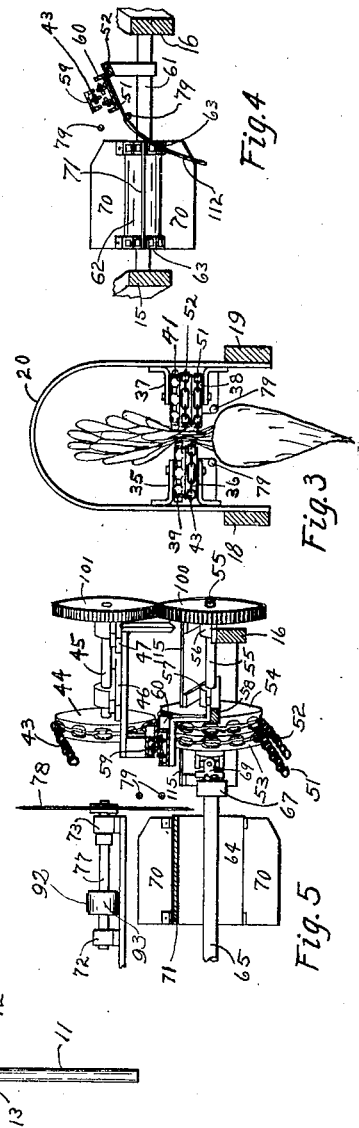

UNITED STATES PATENT OFFICE.

WALTER B. SMITH, OF SPRINGFIELD, OHIO.

BEET-HARVESTER.

1,347,596.  Specification of Letters Patent.  Patented July 27, 1920.

Application filed September 17, 1915. Serial No. 51,196.

*To all whom it may concern:*

Be it known that I, WALTER B. SMITH, a citizen of the United States, residing at Springfield, in the county of Clark and State of Ohio, have invented new and useful Improvements in Beet-Harvesters, of which the following is a specification.

This invention relates to new and useful improvements in beet harvesters.

An important object of the invention is the provision of means for picking up the flaring tops of the beets and properly presenting them to the gripping means to be hereinafter described.

Another important object of the invention is the provision of means for cutting and dividing fallen leaves, dead grass and other obstructive growth in the path of the digging means.

And still another object of the invention is the provision of novel digging mechanism by which the beet is raised from the ground free from dirt and without injury to its body portion.

Other important objects will be set forth in the following specification, and particularly pointed out in the subjoined claims.

The preferred form of embodiment of my invention is illustrated in the accompanying drawings, of which Figure 1 is a side elevation of my improved beet harvester. Fig. 2 is a top plan view of the same. Fig. 3 is a section taken on the line *a—a* of Fig. 2, showing the beet as its top is entering the grip of the endless gripping chains. Fig. 4 is a section taken on the line *b—b* of Fig. 2, showing the guide rods, endless chains and booster shield at the front of the harvester. Fig. 5 is a section taken on the line *c—c* of Fig. 2, showing the endless carrier, topping disk, guide rods and gripping chains at the rear of the machine.

Throughout the specification and drawings, similar reference characters denote corresponding parts.

In a detailed description of the preferred form of embodiment of my invention, the main frame of the harvester consists of two longitudinal forged steel side members 1 and 2 which incline outwardly from a front end member 3. Secured to the lower middle portion of the member 3 is the ordinary fifth wheel construction 4 which rests upon, and is secured to, a tongue support 5. Connected to and projecting outwardly and downwardly from each side of the tongue support 5, is an axle-supporting arm 6 to the lower end of which the axle 7 of a front supporting wheel 8 is secured. While the axle-supporting arms 6 pass downwardly on the outside of the front wheels 8, a V shaped brace 9 forms an inside support for each of their axles 7.

Projecting downwardly from the rear portions of the side members 1 and 2, are two V shaped supporting pieces 10 which tightly receive at their lower ends a transverse shaft 11 upon which are loosely mounted two rear supporting wheels 12. The shaft 11 extends a sufficient distance beyond the side member 1 to enable the left wheel 12 to be set at variable distances from its companion wheel 12, by adjustable collars 13, for the purpose of enabling said wheels to straddle different width rows.

Lying within the main frame, and loosely mounted upon a shaft 14 secured between the rear ends of the side members 1 and 2, are two forged steel side beams 15 and 16. These side beams are connected at their rear ends by a transverse member 17, the side beam 15 curving inwardly in front and terminating in a forwardly extending portion 18, while the other side beam 16 terminates at its front end in a forwardly extending portion 19. Connected to, and extending upwardly from the forwardly extending portions 18 and 19 of the side beams 15 and 16 respectively, for the purpose of firmly securing them together, is a bow or arched shaped member 20 which straddles the gripping mechanism to be hereinafter described.

For the purpose of raising the front portion of the auxiliary frame, a transverse shaft 21 is journaled in suitable bearings secured to the side members 1 and 2 of the main frame. Pinned to each side of the shaft 21 is a chain 22, the chain on the left side supporting at its lower end the front portion of the side beam 16, while the chain on the right side supports at its lower end the front portion of the side beam 15. Accordingly, by means of a lever 23 pivoted to the side member 2 and carrying a dog 23$^a$ which engages a ratchet 23$^b$ on the shaft 21, the latter may be rotated to cause the chains 22 to raise or lower the front portions of the side beams 15 and 16 of the auxiliary frame. This operation is necessary to raise the digging mechanism above the ground when desired.

Adjustably secured to each one of the forwardly extending portions 18 and 19 of the side beams 15 and 16 respectively, by means of a U bolt 24, is a forwardly and downwardly extending forged steel digging member 25. Integral with, or otherwise secured to the lower end of each digging member 25, is a horizontally disposed wing piece or plow 26, said plow pieces being preferably twisted or curved inwardly to conform to the contour of the body portion of the beet. These plow pieces 26 straddle the beet row, and when they move through the ground, they loosen and raise the dirt around the beets in a manner somewhat similar to an auger. The result is, that when they elevate the dirt around the beet, the latter is raised or crowded out of the ground, and the tap root broken, without injury to its body portion and with a minimum draft for accomplishing the work. Furthermore, as these twisted plow pieces pass through the ground, they ripple and pulverize the earth around the beet so effectually that very little, if any, will cling to it when raised.

Secured to and extending forwardly from the front portions 18 and 19 of the side beams 15 and 16 respectively, above the plow pieces 26, is a pair of supporting members 27. To the extreme outer end of each of the members 27 there is pivoted a disk 28 adapted to ride over the surface of the ground a short distance in front of the digging members 25, for the purpose of cutting and dividing, on each side of the beet row, all fallen and dead leaves, grass, weeds and any other obstructive growth in the path of the digging mechanism. These disks 28 therefore prevent such trash from accumulating before the digging mechanism to obstruct and clog the same. (See Figs. 1 and 2).

Extending downwardly from the tongue support 5 are two pairs of depending members 29, each pair being so arranged as to form the suspension means for a vertically disposed fender 30. These fenders 30 are suspended in parallel relation to each other between the front wheels 8, and provide sufficient space between them to receive and conduct between those wheels, the flaring leaves of the beet tops which are picked up by the following device.

Secured to and projecting forwardly from the depending members 29, are two parallel fingers or rods 31, which curve downwardly and forwardly to permit their forward ends to lie in a plane just above, under, or near the surface of the ground, one on each side of the beet row. These fingers are curved upward and backward in such a manner that, as the machine travels forward, their front ends move under the drooping and flaring leaves of the beet lying on or near the ground, thereby removing them from the path of the front wheels of the machine, and collecting and raising them so that they will be received between the fenders 30. The latter protect and conduct them between the front wheels 8, and also maintain them in a vertical position for proper presentation to the gathering and gripping means now to be described.

Projecting forwardly from each side of the bow-shaped member 20, is a longitudinal supporting member 32. To the front end of each of the supporting members 32 is secured a bracket 33 within which is pivoted a horizontally disposed sprocket wheel 34.

Secured to the lower right portion of the bow-shaped member 20, is a bracket 35 within which is pivoted a double sprocket wheel 36. Secured to the lower left portion of the said bow-shaped member 20, opposite the bracket 35, is a similar bracket 37 within which is pivoted a triple sprocket wheel 38. (See Figs. 1, 2 and 3). The top sprocket sections of each of the sprocket wheels 36 and 38 are in approximate horizontal alinement with the left and right single sprocket wheels 34 in front of them.

Passing around the top sprocket section of the double sprocket wheel 36, and the right sprocket wheel 34, is an endless chain 39 having sharp projections 40 thereon. A similar chain 41 containing like projections 42, passes around the upper sprocket section of the triple sprocket wheel 38 and the left sprocket wheel 34. As will be observed from Figs. 1, 2 and 3, the sprocket wheels 36 and 38 are adapted to draw the inner runs of their respective sprocket chains 39 and 41 rearwardly toward each other, in a plane just above the surface of the ground, and on each side of the beet row. As the machine travels forward, the chains 39 and 41 during their rearward movement, collect and bring together the flaring and drooping leaves of the beet tops and forcibly deliver them to the gripping chains now to be described.

Passing around the lower sprocket section of the sprocket wheel 36 is an endless chain 43, which also passes around a vertically disposed sprocket wheel 44 fast on a countershaft 45 journaled in bearings provided on two parallel supporting pieces 46 and 47. The rear ends of these pieces are secured to the transverse member 17, while their forward ends are connected to a support 48 secured to the side beam 16.

The upper run of the chain 43 passes over an idler 49 loosely mounted on one end of a rod 50 secured to the side beam 15, and thence over said idler to the lower sprocket section of the horizontally disposed sprocket wheel 36, and thence around the latter and back to the sprocket wheel 44 in a manner to be hereinafter described.

Passing around the two lower sprocket sections of the triple sprocket wheel 38, are two endless chains 51 and 52 which also travel around two vertically disposed sprocket wheels 53 and 54 respectively, mounted side by side on a shaft 55 journaled in a bearing 56 on the side beam 16 and a similar bearing 57 provided on a supporting member 58. The sprocket wheels 36 and 38 lie in approximately the same horizontal plane, and in close proximity to each other, so that the chains 43, 51 and 52 passing around them, may grip the tops of the beets as they are forcibly delivered to them by the gathering or fan chains 39 and 41. (See Fig. 3.)

The chain 43 as it travels to the rear of the machine, passes through a channel iron 59 which extends from a point near the sprocket wheel 36 to a point near the sprocket wheel 44. During their rearward movement, the chains 51 and 52 travel through a channel iron 60, which extends in longitudinal proximity to the channel iron 59 and but a short distance removed from the latter, to permit the beet tops to readily pass between them. At the front part of the machine these channel irons 59 and 60 have a position which permits them to grip the beet tops vertically, gradually twisting in the direction of their rear ends to permit the beets to be turned to a lateral position by means now to be described.

Mounted for rotation on a shaft 61 secured to the side beams 15 and 16 of the auxiliary frame, in the rear and at one side of the sprocket wheel 36, is a double sprocket roller 62. Passing around the latter is a pair of endless sprocket chains 63, which also travel around a double sprocket wheel 64 fast on a shaft 65 journaled in a bearing 66 mounted on the side beam 15, and a similar bearing 67 mounted on a supporting member 68. It will be observed by referring to Fig. 5, that the shaft 65 is connected to the shaft 55 by a knuckle joint 69 to permit the gripping chains to incline away from the endless carrier as they move toward the rear part of the machine. (See Figs. 2 and 5.)

The sprocket chains 63 are connected together at spaced intervals by outwardly projecting metal wings or paddles 70, which travel over a metallic floor 71 disposed between the said chains, and extending from a point near the sprocket roller 62 to a point slightly beyond the sprocket wheel 64.

After the beet tops are gripped between the chains 43, 51 and 52, their body portions, having been raised from the ground by the digging mechanism hereinbefore described, will be received by the endless carrier formed by the sprocket chains 63 and wings 70, and moved rearwardly to a topping device to be hereinafter described.

The beet is received by the said carrier in a vertical position, and is gradually changed to a horizontal position in the following manner. The endless carrier at a point where it receives the beets, is in a plane below the gripping chains 43, 51 and 52, and as it passes to the rear of the machine, it gradually approaches the horizontal plane of said gripping chains, whereby the beet and its top are slowly changed from a vertical to a horizontal position. The tops of the beets during this movement are firmly held by the gripping chains, inasmuch as when the latter pass rearwardly, they gradually twist or overlap, due to the horizontal and vertical positions of their front and rear sprocket wheels respectively, and aided by the twisted channel irons in which the chains travel.

Journaled in bearings 72 and 73 mounted on supports 74 and 75 respectively, extending between the end member 17 and a brace 76 supported by the side beam 15, is a shaft 77. Fast on the latter, in a position to extend downwardly between the endless carrier and gripping chains just described, and close up to the former, is a saw tooth disk 78 for topping the beets presented to it by the said carrier and gripping chains. (See Figs. 1, 2 and 5.)

In order to firmly hold the body portions of the beets on the endless carrier just described, against the pull exerted by the gripping chains 43, 51 and 52, a pair of longitudinal guide rods 79 are secured in the auxiliary frame between the cutting disk 78 and said gripping chains in the rear of the machine, and between the endless carrier and gripping chains in the front part of the harvester, said rods being adjustable at their rear ends. These rods 79 are spaced far enough apart to allow the tops of the beets to pass freely between them, at the same time holding the body portions of the latter on the endless carrier against any pull that may be exerted by the gripping chains. And since the beet is first received by said chains and carrier in a vertical position and gradually changed by them to a horizontal position, the rods 79 lie in a horizontal plane in the front part of the machine and gradually twist to a vertical plane in the rear thereof, in order that the top of the beet may at all times pass freely between them.

For the purpose of driving the endless carrier, gripping chains and cutting disk, the following mechanism is provided. Mounted on a plate 80 supported by the front ends of the side members 1 and 2, is an internal combustion engine 81. While I prefer an internal combustion engine as the means for propelling my harvesting mechanism, any other form of prime mover may be employed if desired.

Mounted on the crank shaft 82 of the internal combustion engine 81, is a sprocket wheel 83. Passing around the latter is an endless sprocket chain 84 which also travels around a sprocket wheel 85 loosely mounted on a shaft 86 journaled in bearings 87 and 88 mounted on inverted V shaped supports 89 and 90 respectively. These latter supports, in turn, rest upon the side members 1 and 2 respectively of the main frame.

Fast on the middle portion of the shaft 86 is a large driving pulley 91 adapted to drive, through a twisted belt 92, a small pulley 93 mounted on the shaft 77, upon which the cutting disk 78 is mounted. The disk 78 may therefore be rotated at a high rate of speed by the belt and pulley construction just described.

Fast on the outer end of the shaft 86 is a sprocket wheel 94 which receives a sprocket chain 95 that also passes around a larger sprocket wheel 96 fast on the shaft 65, to drive the latter. Loosely mounted on a pivot 97 carried by the outer end of an arm 98 pivoted to a bracket 98ª on the side member 1, is an idler 99 which rides upon the upper run of the sprocket chain 95 to keep the latter taut at all times.

As has been stated, the sprocket wheel 64 which moves the endless carrier chains 63, is fast on the shaft 65; and the latter is connected, by a knuckle joint 69, to the shaft 55 on which the sprocket wheels 53 and 54, that move the endless gripping chains 51 and 52, are mounted. Accordingly, when the shaft 65 is rotated by the endless sprocket chain 95, the carrier chains 63 and endless gripping chains 51 and 52 will be driven in unison to move the beets toward the cutting disk 78, being assisted by the endless chain 43 which is operated by the following mechanism.

Fast on the outer end of the shaft 55, is a gear 100 which meshes with a gear 101 fast on the counter shaft 45. Accordingly, when the shaft 55 is rotated, the sprocket wheel 44 which is fast on the shaft 45, will also be rotated to move the gripping chain 43 in conjunction with its companion chains 51 and 52, whereby the beet tops will be firmly gripped and drawn rearwardly by their combined movement.

Not only are the endless carrier and gripping chains operated from the shaft 86, but the cutting disk 78 is also rotated therefrom to top the beets as the latter are presented to it by the said carrier and chains.

In order to keep the belt 92 taut at all times, the following construction is provided. Secured upon the side members 1 and 2 is a transverse supporting member 102, to which is attached, near the plane of the belt 92, a bracket 103. Pivoted within the bracket 103 is a lever 104 having an upwardly extending portion 105 to which is pivoted a roller 106 over which the lower run of the belt 92 travels.

Also mounted on the transverse supporting member 102 is a semi-circular ratchet 107 adapted to be engaged by a projection 108 provided on the lever 104. It is therefore possible, by setting the lever 104 at a desired position, to place the roller 106 at that elevation which imparts to the belt 92 the requisite tautness.

For the purpose of assisting in the operation of placing the body portions of the beets on the endless carrier, after they are dug from the ground, there is fixed in the auxiliary frame between the sprocket wheel 36 and the sprocket roller 62, a cone shaped shield 112. The nose portion of this shield extends under the channel irons 59 and 60, and then curves rearwardly therefrom toward the sprocket roller 62. Accordingly, when the top of the beet is lifted and pulled rearwardly by the gripping chains 43, 51 and 52, the body portions thereof will strike the shield 112 and be turned by it toward the endless carrier, which receives and carries it to the topping device 78 in the rear of the machine. The shield or booster 112 therefore actively assists the guiding rods 79 and endless chains 43, 51 and 52 in correctly depositing the body portions of the beets upon the endless carrier. It also cooperates with the said carrier, guiding rods and endless gripping chains in changing the beet from a vertical to a horizontal position for its journey to the cutting disk 78 in the rear of the machine.

Mounted upon the transverse member 102 is an inclined support 113 to the upper end of which there is secured a seat 114 for the driver of the harvester.

For the purpose of delivering the topped beets into a wagon or other receptacle, or depositing them at a desired place, there is attached to the rear end of the machine an elevator and chute construction.

As the harvester travels over a row of beets, the fingers 31 pass under the drooping and flaring leaves of the beet tops to collect and raise them from the path of the front wheels and digging device, as well as to guide them between the fenders 30. These fenders in turn bring together the flaring beet top leaves for a safe course between the front wheels and out of the way of the digging mechanism. They also collect and position the tops in such a manner that they will be correctly received by the fan chains 39 and 41.

The beet tops are now engaged by the protruding elements on the fan chains 39 and 41 as the latter move rearwardly, with the result that their flaring and drooping leaves are collected and compressed for forcible delivery to the gripping chains 43, 51 and 52 which stand ready to receive them.

In the meantime the digging members 25 have sent their twisted plow attachments 26 under the body portions of the beets, to pulverize the dirt around the same, with the result that the beets are raised, and their tap roots broken, without injury to their body portions and with a minimum draft for accomplishing this work.

The operation of digging is facilitated by the disks 28, which have given the plows 26 an unobstructed field by severing and dividing all fallen and dead leaves, grass, weeds and other impeding growth in the path of the digging mechanism. The result is that such trash cannot accumulate in front of the digging mechanism to clog it.

After being received between them, the hold of the gripping chains 43, 51 and 52 is at once tightened on the beet tops, with the result that the latter are drawn rearwardly between the guide rods 79 which stand ready to receive them. At the commencement of their rearward journey, the body portions of the beets are pulled by their gripped tops against the curved boosting shield 112, which forces them outwardly and upwardly into a position to be received by the endless carrier. This boosting shield 112 also actively assists the said carrier, guide rods and endless gripping chains in changing the beets from a vertical to a horizontal position for their rearward course to the cutting disk.

By the time the beet has reached the topping disk 78, which extends between the endless carrier and the guide rods 79, the beet is in a correct horizontal position for topping. At this point the guide rods 79, bearing against the shoulder of the beet at a greater distance from the gripping chains than in the front part of the machine, serve to place the beet top under a tension which enables the disk 78 to make a clean cut, at the right place, on beets of varying sizes.

After being severed from their body portions, the beet tops are released by the gripping chains upon a downwardly curved shield 115 secured in the rear of the auxiliary frame. This shield guides the beet tops toward the ground without danger of their falling upon and clogging the rear sprocket and chain mechanism.

The severed body portions of the beets are forced by the wings 70 of the endless carrier, upon an elevator mechanism.

I do not wish to be limited to the details of construction and arrangement herein shown and described, and any changes or alterations may be made therein to suit different conditions of use.

Having described my invention, I claim:

1. In a beet harvester, beet digging mechanism, a topping device, endless chains for gripping the tops of the beets as they are dug from the ground, an endless carrier to receive the body portions of the beets from the digging mechanism, and a device disposed below the gripping chains and slightly in advance of the endless carrier, to properly position the body portions of the beets on the latter, substantially as described.

2. In a beet harvester, beet digging mechanism, endless chains for gripping the tops of the beets as they are dug from the ground, an endless carrier to receive the body portions of the beets from the digging mechanism, a topping device, and a curved shield mounted below the gripping chains and slightly in advance of the endless carrier, to assist in placing the body portions of the beets in a horizontal position upon the latter, substantially as described.

3. A beet harvester comprising a wheel-supported frame, digging mechanism mounted therein, pulleys provided in the front and rear ends of said frame, endless chains passing around said pulleys to grip the tops of the beets as they are dug from the ground, a topping device, an endless carrier to convey the body portions of the beets from the digging mechanism to the topping device, and a cone-shaped shield mounted below the gripping chains and slightly in advance of the endless carrier, to assist in placing the body portions of the beets in a horizontal position upon the latter, substantially as described.

4. A beet harvester comprising a wheel-supported main frame, an auxiliary frame mounted therein, digging mechanism secured to the forward end of said auxiliary frame, pulleys provided in the forward and rear ends of said frame, endless chains passing around said pulleys to grip the tops of the beets as they are dug from the ground, sprocket wheels provided in the front and rear ends of said auxiliary frame, a pair of sprocket chains passing over said sprocket wheels and connected together at spaced intervals to form an endless carrier which receives the body portions of the beets from the digging mechanism, a topping device between the rear portions of said gripping chains and endless carrier, and a cone-shaped shield secured to said auxiliary frame, below said gripping chains and slightly in advance of the front sprocket wheel of the endless carrier, and pointed toward the digging mechanism, to assist in placing the body portions of the beets in a horizontal position upon the carrier, for topping, substantially as described.

In testimony whereof I have hereunto set my hand this 13th day of September, 1915.

WALTER B. SMITH.

Witnesses:
 HOWARD S. SMITH,
 WALTER V. SNYDER.